Dec. 23, 1958  F. M. PRUCHA  2,865,091
RING ASSEMBLY FIXTURE

Filed Dec. 30, 1954  6 Sheets-Sheet 1

INVENTOR
Frank M. Prucha
BY
L. D. Buch
ATTORNEY

Dec. 23, 1958   F. M. PRUCHA   2,865,091
RING ASSEMBLY FIXTURE
Filed Dec. 30, 1954   6 Sheets-Sheet 2

INVENTOR
Frank M. Prucha
BY L. D. Burch
ATTORNEY

Dec. 23, 1958

F. M. PRUCHA 2,865,091

RING ASSEMBLY FIXTURE

Filed Dec. 30, 1954

INVENTOR
Frank M. Prucha
BY
L. D. Burch
ATTORNEY

Dec. 23, 1958  F. M. PRUCHA  2,865,091
RING ASSEMBLY FIXTURE
Filed Dec. 30, 1954  6 Sheets-Sheet 4

INVENTOR
Frank M. Prucha
BY L. D. Burch
ATTORNEY

Dec. 23, 1958 F. M. PRUCHA 2,865,091
RING ASSEMBLY FIXTURE
Filed Dec. 30, 1954 6 Sheets-Sheet 5

INVENTOR
Frank M. Prucha
BY
L. D. Burch
ATTORNEY

United States Patent Office 2,865,091
Patented Dec. 23, 1958

2,865,091

RING ASSEMBLY FIXTURE

Frank M. Prucha, Birmingham, Mich., assignor to General Motors Corporation, Detroit, Mich., a corporation of Delaware Application December 30, 1954, Serial No. 478,796

3 Claims. (Cl. 29—222)

This invention relates to assembly fixtures, and more particularly to a fixture for operations such as assembling piston rings in piston ring grooves.

It is presently the practice, in the manufacture of internal combustion engines and the like, to assemble piston rings on pistons by what are essentially hand methods, depending in many cases upon an operator to apply the proper pressure to the piston with the aid of an arbor holding the piston ring. This is a very fatiguing operation, so much so that considerable difficulty has been encountered in keeping trained operators on this job. Also, quality has been adversely affected because the hand operation results in nicking of the top edge of the pistons, in breaking of piston rings during assembly and occasional failure of the operators to remove the broken rings from the grooves and in various other defects.

It is now proposed to provide a semi-automatic fixture for assembling piston rings on pistons which will greatly reduce operator fatigue and dislike for this operation. Also, the fixture substitutes precise mechanical operation for variable and often faulty human effort and thus increases production while improving the quality of the product.

The preferred embodiment of the proposed fixture has a station for each piston ring groove, and each of these stations includes arbor means for holding a stack of the particular rings to be assembled into that particular groove. Each of the arbor means has associated therewith means for intermittently moving the arbor through the stack of rings in order to apply the rings one at a time to corresponding grooves of a number of pistons. Thus, all that the operator is required to do is to insert the grooved end of the piston into a recess provided therefor at each station, thereby activating each such station so that the proper ring is automatically applied.

Figure 1:
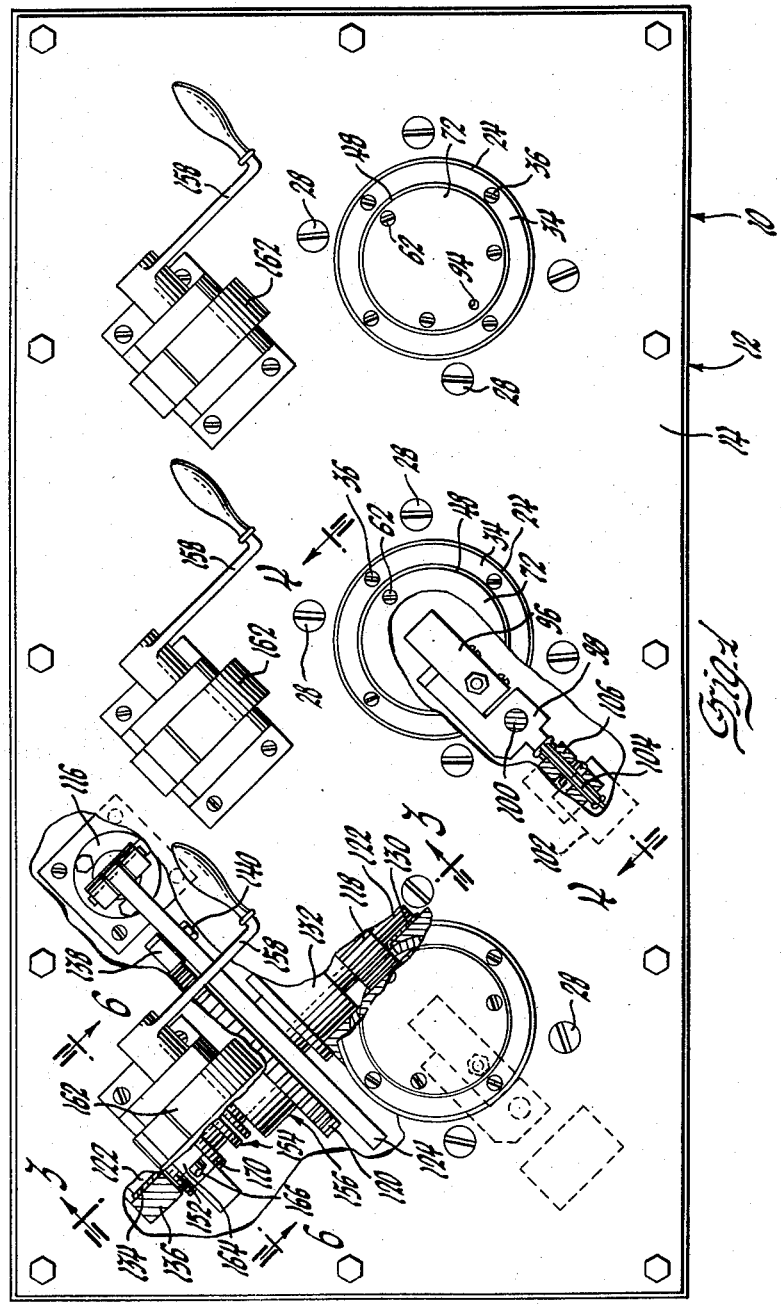
Figure 1 is a top plan view with portions thereof cut away and in cross-section of a three-station fixture embodying the invention.

Referring to the drawings in greater detail, a fixture 10 embodying the invention preferably includes a bench-type base 12 constructed in the usual manner from commercially available structural members and having the top plate or working surface 14 thereof located at a convenient height above the floor line so that the fixture may be operated by individuals of various size. The base, of course, provides the support for mounting the other parts of the fixture in operative relation. The proposed fixture may have as many piston ring storage and assembly stations 16 as desired, but it has been found convenient to have as many such stations as there are grooves 18 in the piston 20. In the preferred embodiment of the invention shown for purposes of illustration there are three such stations. The structures of the individual stations are preferably identical, except for a few minor but important differences which will be pointed out later.

At each station 16 a circular opening 22 is provided in the top plate 14 to receive the annular shoulder 24 provided on the mounting block 26 which may be secured to the underside of the top plate in any suitable manner such as by the bolts 28. The mounting block 26 has a bore 30 which defines the inner periphery of the annular shoulder 24 and receives the bushing 32 which has a radial flange 34 at the top thereof so that the bushing may be secured to the annular shoulder 24 by means such as the screws 36.

At each of the stations 16 there is an arbor 38 operable axially through the bushing 32, one purpose of the arbor being to provide means for storing a quantity of piston rings at each station. The rings are mounted on the arbor 38 in a continuous stack 40, with the lowermost ring 42 resting on or against the radial flange 34 of the bushing and the uppermost ring 44 having its top or outer face 46 in the plane of the free end 48 of the arbor 38. The method of mounting the rings is best shown by the broken lines in Figures 2 and 4. For convenience in machining and for purposes of reducing weight, the arbor 38 may comprise a hollow tubular structure made up of three sections, with the walls of all of the sections being sufficiently thick to permit the machining or otherwise forming therein of various functional elements. This is merely a mechanical expedient however, and the arbor, as well as the means for supporting the same, may be constructed in any desired manner.

Figure 2:
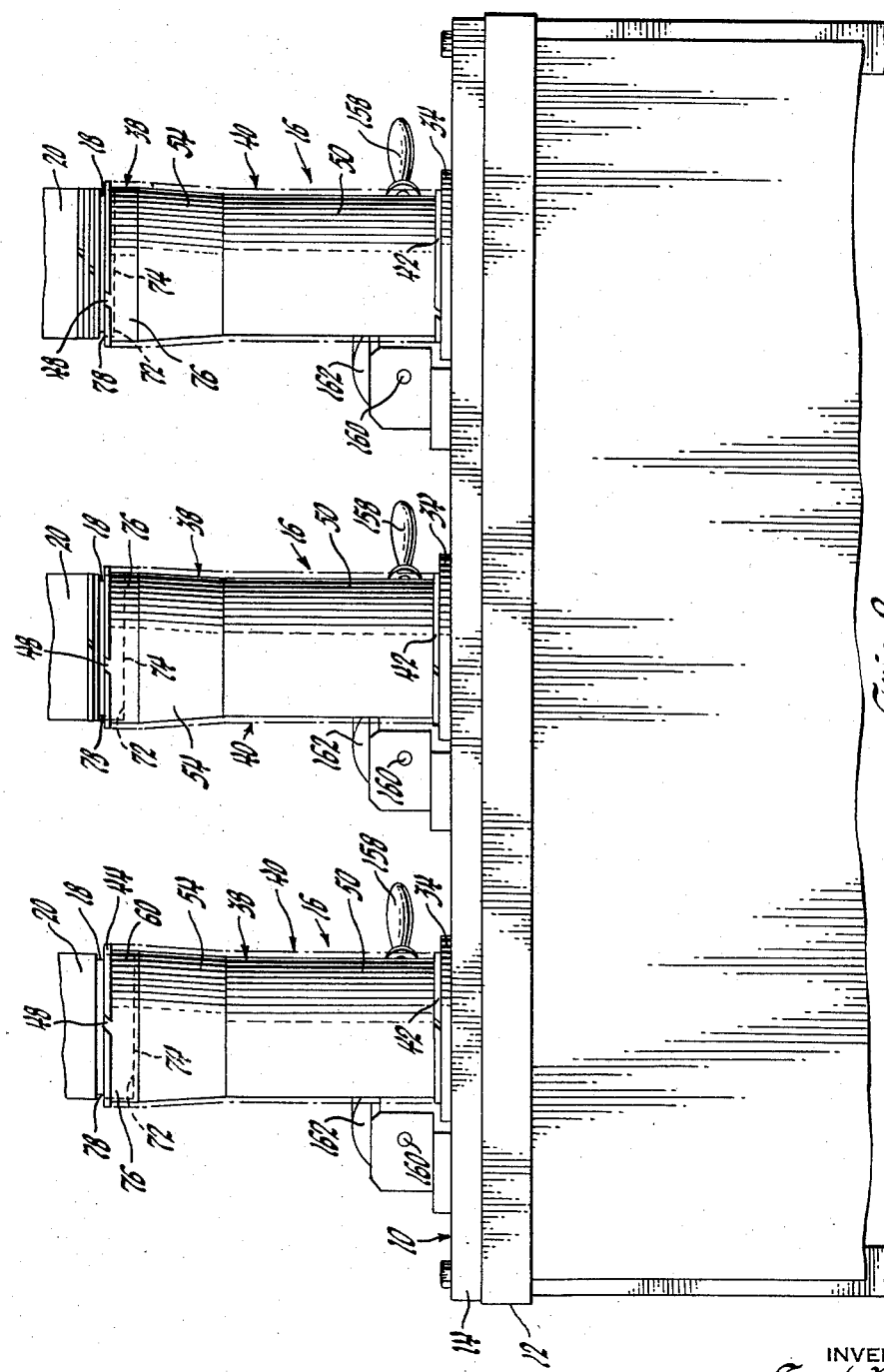
Figure 2 is a fragmentary side elevational view of the fixture shown by Figure 1. The grooved end of a piston is shown in ring-receiving position at each station, and the broken lines represent continuous stacks of piston rings.
Figures 4, 5:
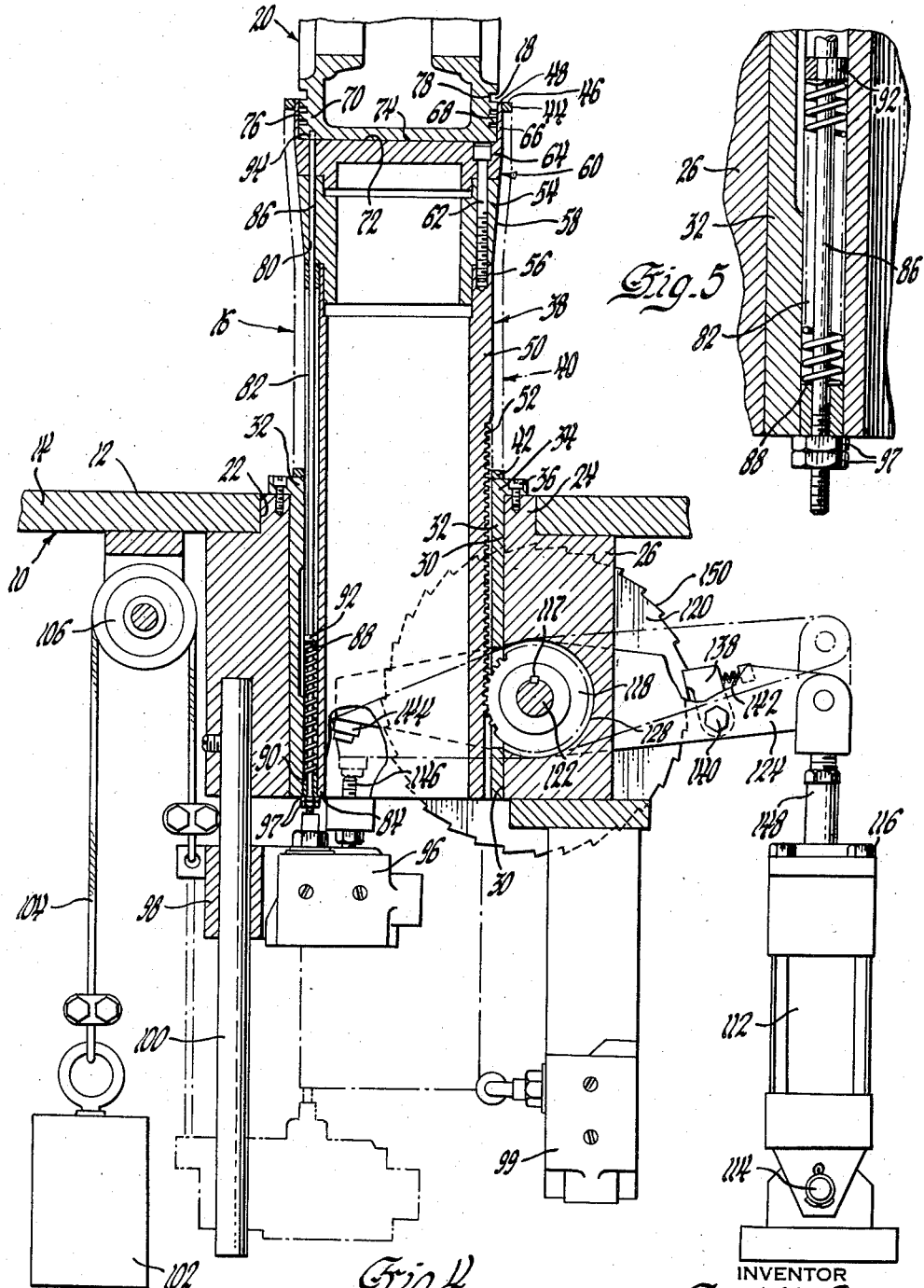
Figure 4 is a cross-sectional view partly in elevation taken on the plane of line 4—4 of Figure 1 and looking in the direction of the arrows. The broken lines at the bottom of the figure illustrate the lowermost position of the arbor on which the piston rings are stacked.
Figure 5 is an enlarged fragmentary view of a portion of Figure 4 better illustrating one end of the spring-loaded rod that actuates the fixture.
Figure 6:
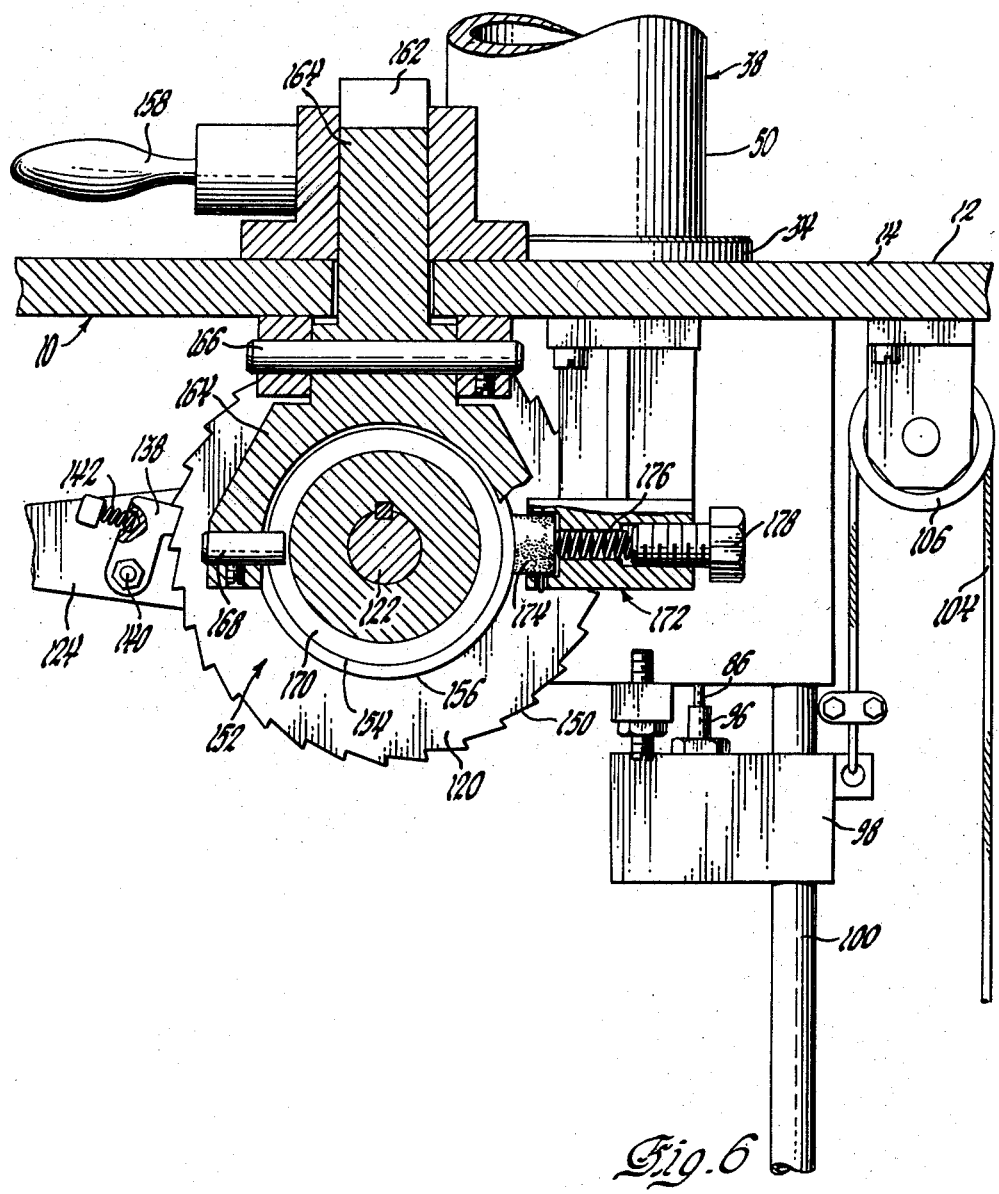
Figure 6 is a cross-sectional view with portions thereof in elevation taken on the plane of line 6—6 of Figure 1 and looking in the direction of the arrows.
Figure 7:
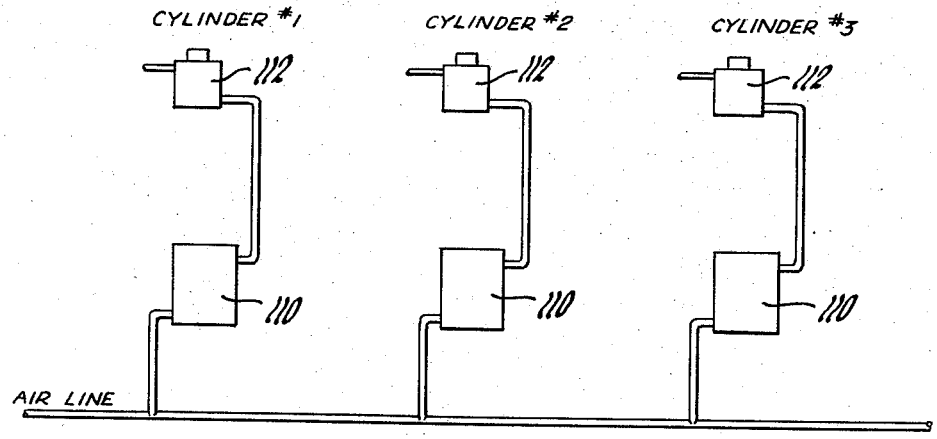
Figure 7 is a diagram of the compressed air system actuating the preferred embodiment of the invention.

The three sections may comprise a lower or end section 50 having a gear rack 52 machined therein, an intermediate section 54 receivable within and secured to the free end 56 of the lower section and having an outward taper 58 on the outer surface thereof and a top or opposite end section 60 secured to the intermediate section. The sections 50, 54 and 60 may be secured together in any desired manner, as by bolts 62 for example, to provide a unitary arbor. The top section 60 has a lower portion 64 having the same taper as the intermediate section 54 and an upper portion 66 having an annular recess 68 formed therein for receiving the grooved end 70 of a piston 20, as shown by Figures 2 and 4. It will be noted that the top section has a transverse wall 72 defining the bottom of the recess 68 and providing a surface on which the end face 74 of the piston may rest and that the peripheral wall 76 defining the recess 68 extends to the upper wall 78 of the piston ring groove 18 when the inverted piston 20 is placed in the recess. The external diameter of the lower section 50 of the arbor 38 is such that an untensioned ring, such as ring 42, may be mounted thereon with sufficient clearance to provide freedom of movement of the ring along the arbor, while the tapered portions 58 and 64 of the arbor 38 increase the arbor diameter sufficiently to expand a ring, such as ring 44, to a diameter exceeding the maximum diameter of the grooved end 70 of the piston 20. The arbor 38 thus provides means for storing a quantity of rings at each station 16 and means for spreading the rings. All of the other details of the fixture, which will now be described in detail, and for which equivalent devices may be substituted without exceeding the scope of the invention, have the purpose of operating the arbor 38 in a manner to apply the rings one at a time to the particular piston ring groove 18 for which the particular station 16 is designed.

As best seen in Figures 4 and 5, each arbor 38 has a passage 80 extending through the sections 54 and 60 thereof and an open groove 82 extending the entire length of the section 50 thereof, with the groove 82 terminating at the bottom free end 84 of the lower section and the passage 80 terminating at the surface 72. Disposed within the aligned passage and groove is a control rod 86 which is mounted for axial movement by any resilient means such as a helical spring 88 extending between the shoulder 90 in the groove and the shoulder 92 on the rod 86. Additional supports for the rod such as support 94 may be provided in the groove. The upper end 94 of the rod extends above the piston support surface 72 a sufficient distance so that downward movement of the end 94 of the rod to the plane of the surface 72 by the weight of the piston 20 is sufficient to actuate the commercially available microswitch 96. The axial position of the rod 86 may be adjusted by threaded means such as the two nuts 97. The weight of the microswitch 96, which is mounted by means such as the bracket 98 for free movement along the bar 100 secured to the mounting block 26, may be counterbalanced by any suitable means such as the weight 102. The weight 102 is connected to the microswitch 96 by the cable 104 suspended over the pulley 106 which is attached to the underside of the top plate 14.

It is thus apparent that when an inverted piston 20 is placed in the recess 68 the rod 86 will be pushed downwardly so that the microswitch 96 is actuated. This will cause the arbor 38 to be moved downwardly a distance equal to the width of the piston ring 44 by means about to be described. When the arbor 38 moves downwardly the microswitch 96 will also be moved downwardly along the bar 100 an equal distance, and it will remain in that position due to its being counterbalanced by the weight 102 until the next downward or axial movement of the arbor 38. When the piston 20 is removed from recess 68 rod 86 is returned by spring 88 and switch 96 is disengaged.

Figure 8:
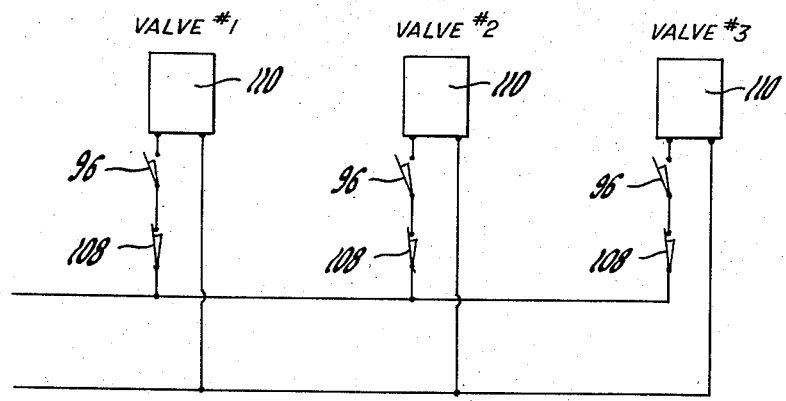
Figure 8 is a wiring diagram illustrating the electrical system employed to control the compressed air system shown by Figure 7.

As can be seen from Figure 8, the microswitch 96 at each station may be connected in series with another microswitch 108 which is normally closed and a solenoid-operated spring-return air valve 110. When the rod 86 actuates the microswitch 96, the solenoid air valve 110 supplies air to the commercially available air cylinder 112 which may be pivotally mounted to the base 12 on the pin 114. The air cylinder 112 is constructed so that the admittance of air forces the piston in the cylinder toward the end 116 of the cylinder, against the pressure of an internally mounted spring which urges the piston back toward the center of the cylinder 112. In this particular case, the air will force the cylinder piston toward the top plate 14, while the spring urges the piston downwardly away from the top plate.

Looking again at Figure 4, the lower section 50 of the arbor has machined thereon a gear rack 52 for meshing engagement with the spur gear 118 in order that the arbor may be moved downwardly through the bushing 32 from the initial upper or fully loaded position shown by solid lines in Figure 4 to the lower or reload position shown by broken lines in Figure 4. The spur gear 118 and the ratchet wheel 120 are both mounted rigidly for rotation with the shaft 122, the former by means of the key 117 and the latter by means of a clutch mechanism to be described, while the rocker arm 124 is pivotally mounted on the shaft 122 by the sleeve bearing 126. The ratchet wheel 120 and the rocker arm 124 are mounted adjacent one another and above the air cylinder 112, and the spur gear 118 is mounted within a recess 128 in the mounting block 26 and in mesh with the gear rack 52. An end bearing 130 and an intermediate bearing 132 for the shaft 122 may be provided in the mounting block 26 on opposite sides of the spur gear 118, and an additional end bearing 134 may be provided for the shaft 122 in the bracket 136 spaced from the mounting block and secured in any desired manner to the underside of the top plate. The ratchet pall 138 is pivotally mounted on the arm 124 by pin 140 for constant resilient engagement through spring 142 with the ratchet wheel 120, and a bumper member 144 may be provided at the opposite end of the arm 124 for engagement with the adjustable screw dead stop 146.

When the microswitch 96 is activated by the rod 86, air supplied to the cylinder 112 will raise the cylinder piston, and the ratchet pall 138 on the arm 124 will turn the ratchet wheel 120 the distance of one tooth 150 in a counterclockwise direction in Figure 4 until the dead stop 146 is engaged by the bumper 144, at which time the ratchet wheel 120 can turn no further. With the proper adjustment of the air cylinder linkage 148 and the dead stop 146 and the proper length of ratchet wheel tooth 150, the spur gear 118 will turn on the shaft 122 with the ratchet wheel 120 through a sufficient angle so that the downward movement of the arbor 38 will be a distance equal to the width of the ring 44 at the top of the arbor. The above adjustments make the fixture 10 adaptable to any desired width of ring at any particular station 16.

It is now apparent that each time a piston 20 is inserted into the recess 68 so that the rod 86 is moved downwardly the arbor 38 will move axially or downwardly through the stack of rings 40 so that the top or end expanded ring 44 will be left without support, at which time it must snap into the piston ring groove 18 radially aligned with the ring. This intermittent axial movement of the arbor may be continued until the arbor 38 reaches the position shown by broken lines in Figure 4, at which time the stack of rings 40 will be exhausted so that the arbor must be reloaded, and microswitch 99 is actuated to open the control circuit.

The ratchet wheel 120 normally prevents the spur gear 118 from turning in a clockwise direction in Figure 4 unless the ratchet pawl 138 is disengaged. This is true because although the ratchet wheel 120 is itself pivotally mounted on the shaft, it is normally fixed for rotation with the shaft 122 by a clutch mechanism 152. The clutch 152 is a convenient method of breaking the drive to the spur gear 118 when it is desired to pull the arbor 38 upwardly and completely out of the fixture 10 so that it may be reloaded with piston rings. In this case, the drive to the spur gear 118 is broken by breaking the connection of the ratchet wheel 120 to the shaft 122 so that the shaft and the spur gear 118 may be rotated free of the ratchet wheel 120.

Figure 3:
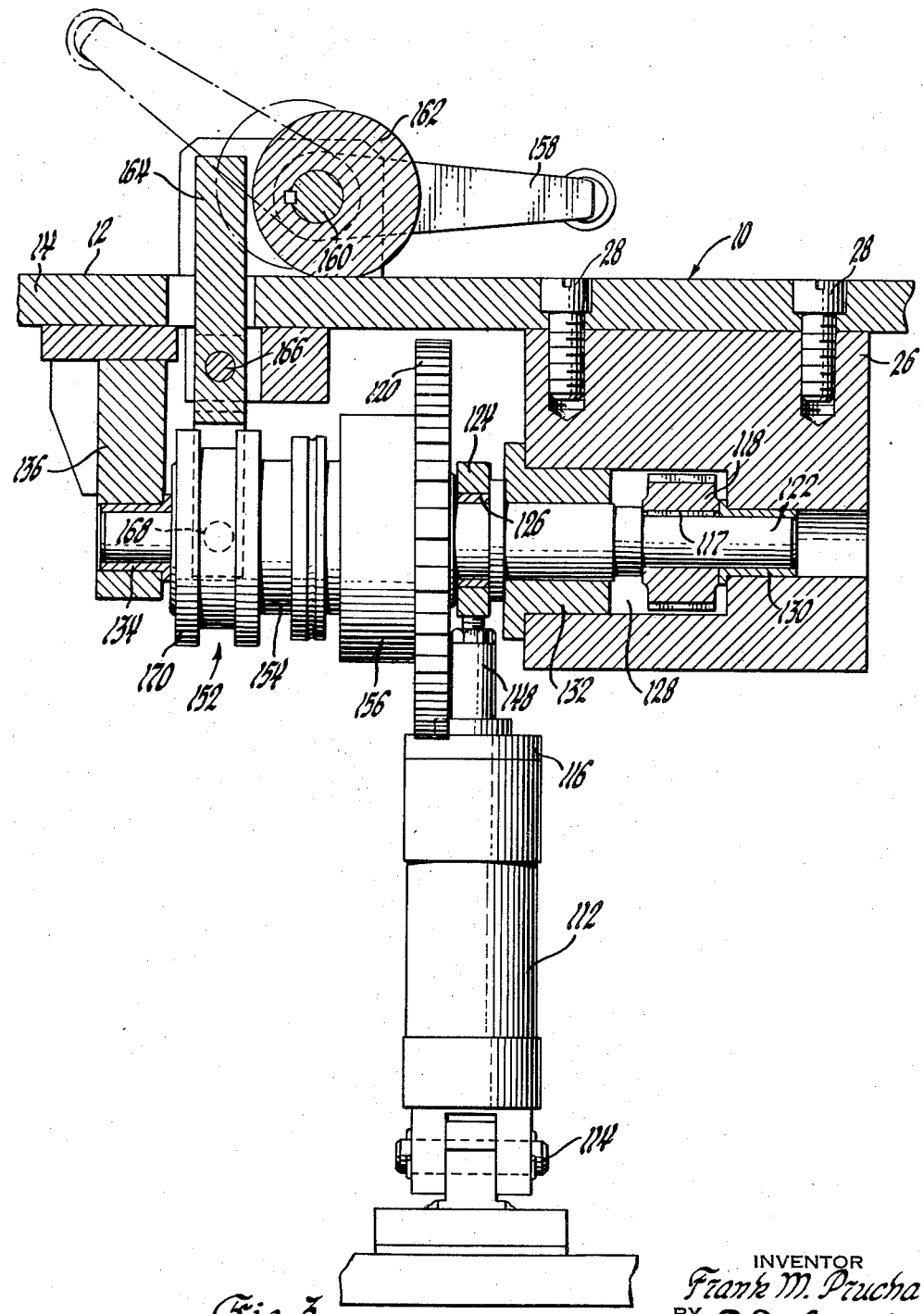
Figure 3 is a cross-sectional view with portions thereof in elevation taken in the plane of line 3—3 of Figure 1 and looking in the direction of the arrows.

In Figure 3, the left-hand portion 154 of the clutch is secured for rotation with the shaft 122 as by a key, while the right-hand portion 156 of the clutch is secured for rotation with ratchet wheel 120. The handle 158, when thrown to the left as shown by the broken lines, rotates the shaft 160 and the cam 162 keyed to the shaft so that the yoke 164, pivoted on pin 166 and having lugs 168, causes the sliding sleeve 170 to move to the right.

In this manner, clutch plates disposed within the right-hand portion 156 of the clutch are engaged so that ratchet wheel 120 is rigid with the shaft 122. Throwing the lever 158 to the right, as shown by solid lines in Figure 3, disengages the clutch plates so that the ratchet wheel 120 is free on the shaft 122 and so that the arbor 38 may be lifted out of the fixture.

An adjustable spring-loaded drag mechanism 172, including bearing member 174, helical spring 176 and adjusting member screw 178, may be provided at each station. The purpose of this drag mechanism is to prevent overrun of the free ratchet wheel 120 with respect to the pawl 138 when the arbor 38 is removed for reloading so that the timing will not be disturbed. It may be desirable to provide such a mechanism for the shaft 122 also.

The use of the above described fixture on a piston assembly line is very simple and convenient so that any unskilled operator can learn to use the fixture with good results in a very short time. Assuming that the fixture 10 has never been used or that all the rings 40 previously loaded on each arbor 38 have been all used up, the clutches 152 at each of the stations 16 may be disengaged as described above so that the arbors 38 may be lifted completely out of the bushings 32. The arbors may then be turned upside down so that additional rings 40 may be applied over the arbor 78 at the end 84 thereof having the smaller diameter. The arbors may be marked so that sufficient number of rings may be loaded to make use of the entire available length of the arbor and yet the spur gear 118 will engage the first tooth of the gear rack 52 when the arbor is placed back into the bushing. The clutches 152 on each of the stations may then be reengaged and the fixture is ready for use.

Though the fixture may be arranged so that any desired sequence of stations may be employed, the embodiment shown is adapted for applying the bottom or oil ring at the left-hand station, the center or first compression ring at the center station and the top or last compression ring at the right-hand station. Since the recesses in the arbors decrease in depth from the left-hand station to the right-hand station, it is apparent that it is more convenient to apply the bottom or oil ring first at the left-hand station so that it is above the end of the arbor and out of the way when the piston is applied to the next recess. This will then be true of each ring applied as the operator places the inverted piston in each of the recesses.

It is apparent from the above specification and drawings that there has been provided a relatively fool-proof semi-automatic fixture for operations such as assembling piston rings in the piston ring grooves. Though, the fixture shown is a semi-automatic device, it is easily adapted by the application of engineering skill to a fully automatic device for the same purpose. Although the preferred embodiment of the fixture shown has the arbors disposed vertically, it is apparent that the fixture may be mounted in any desired manner to make the use thereof more convenient.

What is claimed is:

1. In a piston ring assembly machine having an arbor adapted to retain a plurality of piston rings and to receive a piston member upon one end thereof, said arbor being reciprocal within a base member for displacing said rings from said arbor and upon said piston member, means automatically initiating the operation of said machine upon the receipt of a piston member upon said arbor which includes a switch member operatively connected to means for axially moving said arbor, said switch member being mounted upon said base member for relative movement with said arbor, means biasing said switch member in engagement with said arbor, and switch actuating means disposed within said arbor for engagement by a piston member received upon the end of said arbor, said last-mentioned means actuating said switch without overcoming said biasing means.

2. In a piston ring assembly machine having means for initiating machine operation as provided for by claim 1, a guide bar secured to said base and disposed parallel to said arbor, said switch member being reciprocal upon said guide base, and counterweighted means biasing said switch member in engagement with the lower extremity of said reciprocal arbor.

3. In a piston ring assembly machine having means for initiating machine operation as provided for by claim 2, said switch actuating means including an elongated rod biased to have one end extend beyond the end of said arbor receiving said piston and to have the other end normally out of actuating engagement with said switch member.

References Cited in the file of this patent
UNITED STATES PATENTS

| | | |
|---|---|---|
| 1,525,765 | Brenner | Feb. 10, 1925 |
| 1,852,613 | Jessen | Apr. 5, 1932 |
| 1,996,566 | Boerger | Apr. 2, 1935 |